March 27, 1928.
W. J. GAGNON
1,664,291
COUPLING FOR BEAD CHAINS
Filed June 25, 1927
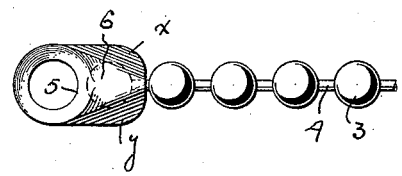
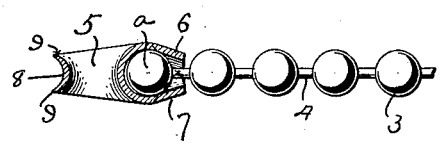
Inventor:
WILLIAM J. GAGNON
By his Attorneys Patented Mar. 27, 1928.

1,664,291

UNITED STATES PATENT OFFICE.

WILLIAM J. GAGNON, OF BRIDGEPORT, CONNECTICUT, ASSIGNOR TO THE BEAD CHAIN MANUFACTURING COMPANY, OF BRIDGEPORT, CONNECTICUT, A CORPORATION OF CONNECTICUT.

COUPLING FOR BEAD CHAINS.

Application filed June 25, 1927. Serial No. 201,540.

My invention relates to couplings, and my object is to provide a simple and effective coupling device for connecting a jump ring or the like to a bead chain.

In the accompanying drawings—

Fig. 1 is a plan view of a coupling embodying my invention; and

Fig. 2 is a side elevation at right angles thereto, the coupling member being shown in section.

The present device is primarily intended for use in connection with bead chains of the type comprising balls 3 flexibly interconnected by dumbbell links 4.

The coupling device is formed from a sheet metal blank drawn to form a tubular eyelet 5 with spaced marginal, end flanges 6 and 7 projecting in the same direction from the eyelet 5. These flanges are spaced sufficiently far apart to accommodate between them the end ball $a$ of a bead chain.

The coupling is connected to the chain by offsetting the flanges 6 and 7 toward each other after the ball $a$ has been inserted therebetween. The opposite sides of each flange are also angled downward as indicated at $x$ and $y$, to prevent lateral escape of the ball from the flanges.

A split jump ring, or the like, may be readily inserted through the tubular eyelet 5, the walls of which are arcuate in cross section, as indicated at 8. It will be noted also that the margins 9 of the eyelet, at a point diametrically opposite the flanges 6 and 7, are thinner than the intermediate portion of the eyelet body. This facilitates the engagement of the split ring with the coupling member since the ends of the split ring need be spaced only slightly apart to accommodate between them one or other of the margins 9, and are automatically spread as the wall is forced between the ring ends. It will also be noted that the overall length of the eyelet, in axial direction, is least at a point substantially opposite the flanges 6 and 7. This also facilitates the engagement of the ring with the eyelet, and also accommodates the eyelet to rings of relatively small diameter.

A drawn eyelet of this type is strong, and at the same time cheap to manufacture. Its connection with the chain end ball is readily accomplished and secure.

I claim as my invention—

1. A coupling device comprising a one piece drawn sheet metal eyelet having end flanges extending from one side of the eyelet and adapted to be offset into engagement with the end ball of a bead chain.

2. A coupling device comprising a drawn sheet metal eyelet having end flanges extending from one side of the eyelet and adapted to be offset into engagement with the end ball of a bead chain, said eyelet having its greatest axial length at the side from which the chain-engaging flanges extend.

3. A coupling device comprising a drawn sheet metal eyelet having end flanges extending from one side of the eyelet and adapted to be offset into engagement with the end ball of a bead chain, the end margins of the eyelet, at a point opposite said flanges, being flared and of reduced thickness, for the purpose set forth.

In testimony whereof I have signed my name to this specification.

WILLIAM J. GAGNON.